(12) United States Patent
Yang et al.

(10) Patent No.: US 8,194,637 B2
(45) Date of Patent: Jun. 5, 2012

(54) METHOD AND APPARATUS FOR ACHIEVING SYSTEM ACQUISITION AND OTHER SIGNALING PURPOSES USING THE PREAMBLE IN AN OFDM BASED COMMUNICATIONS SYSTEM

(75) Inventors: Yunsong Yang, San Diego, CA (US); Jianmin Lu, San Diego, CA (US); Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 13 days.

(21) Appl. No.: 12/719,709

(22) Filed: Mar. 8, 2010

(65) Prior Publication Data

US 2010/0157957 A1 Jun. 24, 2010

Related U.S. Application Data

(62) Division of application No. 11/934,378, filed on Nov. 2, 2007, now Pat. No. 7,693,031.

(60) Provisional application No. 60/884,209, filed on Jan. 9, 2007.

(51) Int. Cl.
*H04J 3/06* (2006.01)
*H04J 3/14* (2006.01)
*H04B 3/10* (2006.01)

(52) U.S. Cl. ......... 370/350; 370/491; 370/500; 370/503

(58) Field of Classification Search .............. 370/203, 370/204, 208, 491, 500, 522
See application file for complete search history.

(56) References Cited

U.S. PATENT DOCUMENTS

| | | | | |
|---|---|---|---|---|
| 7,236,554 | B2 * | 6/2007 | Gupta | 375/355 |
| 7,701,927 | B2 * | 4/2010 | Stampfl et al. | 370/352 |
| 7,706,352 | B2 * | 4/2010 | Rinne et al. | 370/350 |
| 2004/0066802 | A1 | 4/2004 | Ro et al. | |
| 2004/0246998 | A1 | 12/2004 | Ma et al. | |
| 2005/0122928 | A1 * | 6/2005 | Vijayan et al. | 370/312 |
| 2006/0203932 | A1 * | 9/2006 | Palanki et al. | 375/295 |

(Continued)

FOREIGN PATENT DOCUMENTS

CN 1491009 A 4/2004

(Continued)

OTHER PUBLICATIONS

Wang, M., et al., "Update on superframe preamble structure in LBC FDD," 3rd Generation Partnership Project 2, Dec. 4, 2006, pp. 1-14, QUALCOMM Incorporated, Maui, HI.

(Continued)

*Primary Examiner* — Warner Wong
(74) *Attorney, Agent, or Firm* — Slater & Matsil, L.L.P.

(57) ABSTRACT

In the system acquisition process system information is non-coherently detected using correlation of reconstructed and received preamble signals, such as the primary broadcast control channel (PBCCH) and the acquisition pilots (TDM1, TDM2, and TDM3). The phase correlation signals between the correlated signals of PBCCH and TDM2 or TDM3 and between the correlated signals of TDM2 and TDM3 are combined to decode other sector interference (OSI) information and the like. Acquisition is also made more efficient by taking advantage of predictable information based on system synchronicity. The sync/async bit is included in at least one of the acquisition pilots. The mobile then uses knowledge of system synchronicity to more efficiently detect the additional information in the superframe preamble.

18 Claims, 8 Drawing Sheets

U.S. PATENT DOCUMENTS

| | | | |
|---|---|---|---|
| 2006/0250937 A1* | 11/2006 | Wang et al. | 370/208 |
| 2007/0081484 A1* | 4/2007 | Wang | 370/315 |
| 2007/0268853 A1 | 11/2007 | Ma et al. | |
| 2008/0039133 A1* | 2/2008 | Ma et al. | 455/552.1 |
| 2008/0043858 A1 | 2/2008 | Lim et al. | |
| 2008/0165886 A1* | 7/2008 | Xiao et al. | 375/295 |
| 2008/0279124 A1* | 11/2008 | Furueda et al. | 370/280 |
| 2008/0285526 A1* | 11/2008 | Gorokhov et al. | 370/338 |
| 2010/0316044 A1* | 12/2010 | Vrcelj et al. | 370/350 |

FOREIGN PATENT DOCUMENTS

| | | |
|---|---|---|
| CN | 1797026 A | 7/2006 |
| EP | 1 276 288 A1 | 1/2003 |
| JP | 2005/086806 | 3/2005 |
| WO | WO 01/91393 A2 | 11/2001 |
| WO | WO 2006/076830 | 7/2006 |

OTHER PUBLICATIONS

Khandekar, A. "Update on preamble pilot and OSICH," $3^{rd}$ Gereration Patnership Project 2, Jan. 8, 2007, pp. 1-9, QUALCOMM Incorporated, Vancuover, BC.

PCT International Search Report and PCT Written Opinion of the International Searching Authority for PCT/CN2008/070050, forms PCT/ISA/220, PCT/ISA/210 and PCT/ISA/237, mailed Apr. 17, 2008, Applicant: Huawei Technologies Co., Ltd., et al., 14 pages.

* cited by examiner

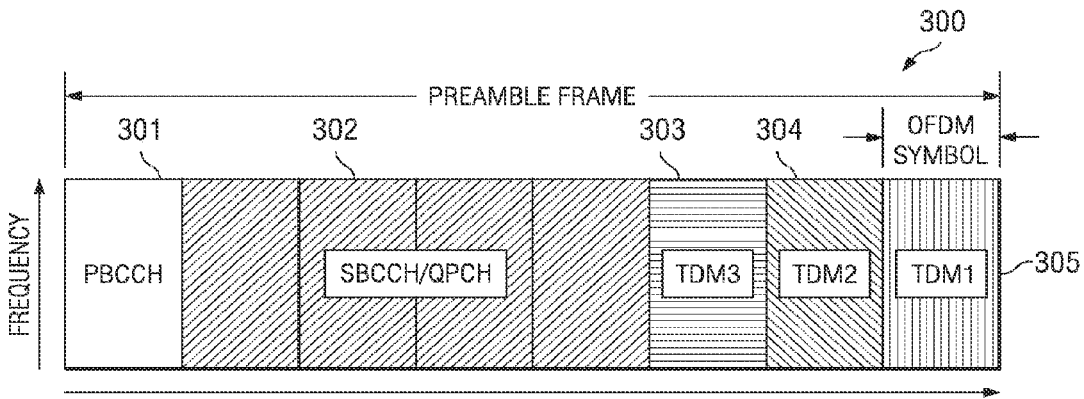

*FIG. 3A*

| TDM3 303 | Sync: 2-bit CP length; 1-bit Half-Duplex; 1-bit Frequency Re-Use on Preamble; and 3 MSBs of PilotPhase<br>Or<br>Async: 2-bit CP length; 1-bit Half-Duplex; 4 LSBs of system time; and 1 MSB of PilotPN |
|---|---|
| TDM2 304 | Sync: 6 LSBs of PilotPhase<br>Or<br>Async: 8 LSBs of PilotPN |
| TDM1 305 | 1 of 6 GCL sequences to indicate 3 possible bandwidths; and 1-bit Sync/Async |

*FIG. 3B*

| TDM1 305 | 1-bit Sync/Async; 1-bit Half-Duplex; 2 MSBs of PilotPhase<br>4 LSBs of system time if Sync/Aysnc == '0';<br>Or<br>1-bit Frequency Re-Use on Preamble;<br>3-bit reserve if Sync/Async == '1' |
|---|---|
| TDM2 304 | 7 LSBs of PilotPhase with the scrambling sequence seeded with the CP value indicated in TDM1 |
| TDM3 303 | 1 of 12 GCL sequences to indicate 4 possible bandwidths; and 2-bit CIP length |

*FIG. 3C*

METHOD AND APPARATUS FOR ACHIEVING SYSTEM ACQUISITION AND OTHER SIGNALING PURPOSES USING THE PREAMBLE IN AN OFDM BASED COMMUNICATIONS SYSTEM

This application is a divisional of patent application Ser. No. 11/934,378, entitled "Method and Apparatus for Achieving System Acquisition and Other Signaling Purposes Using the Preamble in an OFDM Based Communications System," filed on Nov. 2, 2007, now U.S. Pat. No. 7,693,031 which application claims the benefit of U.S. Provisional Application No. 60/884,209, filed on Jan. 9, 2007, entitled "Method and Apparatus for Achieving System Acquisition and Other Signaling Purposes Using the Preamble in An OFDM Based Communication System," both of which applications are hereby incorporated herein by reference.

TECHNICAL FIELD

The present invention generally relates to a wireless communications system. More particularly, the present invention relates to a novel and improved method and apparatus for achieving system acquisition and other signaling purposes using the preamble in an OFDM or OFDMA based wireless communication system.

BACKGROUND

In wideband wireless communication systems, the signal often tends to weaken from frequency selective fading due to multi-path transmissions. Frequency selective fading is a radio propagation anomaly generally caused by the partial cancellation of a radio signal by itself As the signal arrives at the receiver by multiple different paths, and at least one of the paths is changing (lengthening or shortening), the combination of the multiple signals sometimes causes partial signal cancellations.

Orthogonal frequency division multiplexing (OFDM) systems have been proposed to overcome the problem of frequency selective fading by dividing the total bandwidth into multiple subcarriers, such that the bandwidth on each subcarrier is sufficiently narrow to enable the data modulation symbols carried by that subcarrier to experience relatively flat fading. An OFDMA system uses the OFDM modulation technique to multiplex the data traffic of several mobile stations in both frequency and time.

FIG. 1 is a block diagram illustrating a typical example of framing structure 10 in an OFDM or OFDMA-based wireless communications system. Communication stream 100 includes the stream of frames that make up the communication transmission. Communication stream 100 typically has multiple preamble frames, such as preamble frame 101, which delimit a particular number, i.e., M, of traffic frames, such as M traffic frames 102-103. The unit made up of the preamble and traffic frames is known as a superframe, such as superframe 111.

Superframe 111 is made up from preamble frame 101 and traffic frames 102 through 103. In an OFDM system, preamble frame 101 and traffic frame 102 consists of multiple OFDM symbols. For example, traffic frame 103 contains OFDM symbol 1-104, OFDM symbol 2-105, through OFDM symbol N-106. Each OFDM symbol, such as OFDM symbol 105, includes inverse fast Fourier transform (IFFT) symbol 109, which is the result of an IFFT operation on the modulation data sequence, cyclic prefix (CP) 108, which is a copy of the last portion of IFFT symbol 109 and is inserted before the IFFT symbol 109, and windowing periods 107 and 110, which shape the modulation pulse so that the radio spectrum of the transmitted signal meets the emission mask requirement set forth by the radio regulatory body, such as the Federal Communication Commission (FCC) in the United States.

Preamble 101 of superframe 111 provides control information for a mobile station to acquire the base station signals in the power-up procedure or to continue to receive the signaling of the updated system parameters after the mobile station becomes active in the system.

FIG. 2 is a diagram illustrating exemplary OFDM preamble structure 200 proposed for the air interface evolution (AIE) of cdma2000 standards. Preamble 200 comprises eight OFDM symbols, including, in the order in which each is transmitted: one OFDM symbol for the primary broadcast control channel (PBCCH), PBCCH symbol 201, which includes the information of the number of guard tones used in the system; four OFDM symbols, SBCCH/QPCH symbols 202, which comprise the secondary broadcast control channels (SBCCHs) in the even-numbered superframes and comprise the quick paging channels (QPCHs) in the odd-numbered superframes; one OFDM symbol for the acquisition pilot, TDM1 203, that is used by the mobile station to acquire: (1) the superframe and the OFDM symbol timing, (2) the size of the fast Fourier transform (FFT) used on the superframe preamble, and (3) the length of the CP used in the system; one OFDM symbol for the acquisition pilot, TDM2 204, that carries 9-bit sector identity information, known as PilotPN, in asynchronous systems, or carries 9-bit PilotPhase in synchronous systems; and one OFDM symbol for the acquisition pilot, TDM3 205, that carries additional 9-bit system parameters. The 9-bit Pilot PN and PilotPhase information carried by TDM2 204 is generally used to facilitate signal processing gain across different superframe preambles, where the Pilot-Phase is typically equal to PilotPN+ system time, where system time is the superframe index.

First, preamble 200 provides a timing reference for the mobile station receiver to align with each received OFDM symbol and to correctly remove CP 108 (FIG. 1) before decoding the data. This is accomplished by having a sequence repeated once in the acquisition pilot TDM1 203. The mobile station receiver detects the timing by constantly searching the peak of correlation between a received sequence with a received and time-delayed sequence. The mobile station can also correct the frequency offset using the time repeating property of this sequence.

After acquiring the timing, the mobile station usually obtains the CP length in order to find the FFT or IFFT symbol boundary of the second OFDM symbol that the mobile station will decode. One conventional method to acquire the CP length information is to correlate CP 108 (FIG. 1) with the last portion of IFFT symbol 109 (FIG. 1) of the received OFDM symbols with all of hypotheses. However, this blind detection method is not very reliable.

Another method that has been disclosed to indicate the CP length in the timing reference sequence transmits one timing reference sequence from multiple possible timing reference sequences in the first acquisition pilot, TDM1 201. Each possible timing reference sequence typically indicates one possible CP length and generally has low correlation with the other timing reference sequences. When detecting the timing, the mobile station receiver correlates the received sequence with the other possible timing reference sequences and selects the one sequence (thereby the corresponding CP length) that yields the highest correlation. However, this method adds more hypotheses on the timing reference sequence, thereby increasing the complexity of the receiver and the probability of a false timing detection.

After detecting the CP length information, the mobile station may detect the PilotPhase or PilotPN in acquisition pilot TDM2 204 by first descrambling TDM2 204 sequence with a common descrambling sequence, and then correlating the descrambled TDM2 204 sequence with all possible TDM2 204 sequences.

After detecting TDM2 204, the mobile station similarly descrambles received TDM3 205 sequence with a unique descrambling sequence seeded with the PilotPhase or PilotPN value detected from TDM2 204. The mobile station then correlates the descrambled TDM3 205 sequence with all possible TDM3 205 sequences. If Walsh sequences are used as these sequences for TDM2 204 or TDM3 205, efficient correlation may be done with fast Hadamard transformation (FHT).

In a time division duplexing (TDD) system, the transmission times between different base stations are synchronous. In a frequency division duplexing (FDD) system, the transmission times between different base stations may be synchronous or asynchronous. Therefore, in acquisition pilot TDM3 205, the base station signals the synchronicity of system to the mobile stations using the Sync/Async bit so that the mobile stations can decode the control information accordingly. Other control information bits included in TDM3 205 are typically the Half-Duplex bit, Frequency-Reuse bit, and 4 least significant bits (LSBs) of the 9 or 12 bits system time to facilitate combining gain across multiple superframe preambles.

In some systems, the phases on TDM2 204 and TDM3 205 sequences are further shifted to one of three possible angles, according to a 3-state other sector interference (OSI) information scheme, to facilitate more effective control of the reverse link inter-cell interference. Once the mobile station acquires the system, it no longer needs to decode the static information (such as the Sync/Async bit) or the predictable information (such as PilotPhase or 4 LSBs of the system time) carried by TDM2 204 and TDM3 205. On the other hand, the OSI information is generally dynamic. It is not needed during the system acquisition stage, but can be helpful once the mobile station becomes active in the system. TDM2 204 sequences are rotated by 0, $2/3\pi$, or $4/3\pi$ (i.e. same as $-2/3\pi$) according to an OSI value of "0", "1", or "2", while TDM3 205 sequences are rotated by 0, $-2/3\pi$, or $2/3\pi$ according to the same OSI value "0", "1", or "2". Therefore, the differential phase between TDM2 204 and TDM3 205 is 0, $2/3\pi$, or $-2/3\pi$ according to the same OSI value "0", "1", or "2". This allows a simple non-coherent OSI detection scheme using the received TDM2 204 and TDM3 205 signals as the phase reference for each other without doing channel estimation, which can be very difficult for the neighboring sectors due to weak signals. The static or predictable information bits carried by TDM2 204 and TDM3 205 of the neighboring sectors may be obtained from the standard signaling messages, such as NeighborList Message and the like.

After detecting TDM3 205 during the power-up process, the mobile station can descramble received PBCCH 201 using the scrambling seed obtained from TDM2 204 and TDM3 205 and then decode the control information on PBCCH 201. Most of the control information carried on PBCCH 201 is static, except that the 9-bit or 12-bit system time, which is the index of the current superframe in the system, keeps increasing once every superframe and cycles through the 9-bit or 12-bit value. Therefore, after acquiring the system, the mobile station no longer needs to decode PBCCH 201, as the information in it is either static (such as the number of Guard tones) or predictable (such as the system time).

During the even-numbered superframes, the second to fifth OFDM symbols 202 in the preamble 200 are used for the SBCCH, which is used for broadcasting sufficient information, such as the information on the hopping patterns, the pilot structure, the control channel structure, the configuration of the transmit antennas, and the like, to enable the mobile station to demodulate traffic frames 102-103 (FIG. 1) that are transmitted by the base station.

There are several drawbacks in the existing preamble design as described above. First, there are too many hypotheses calculated in processing TDM1 timing reference sequences, which typically increases the complexity of receivers and the probability of false detection of timing. Second, if there is a false detection of timing or a detection error in the CP length information, the mobile will use the wrong received signal as the received TDM2 signals. After descrambling and FHT, the mobile station may still detect a valid FHT value based on this incorrect value, which would lead to error in the PilotPhase detection. The mobile station will then use the wrong PilotPhase to further descramble the received TDM3 signal, resulting in a wrong TDM3 detection also. Because the acquisition pilots TDM1, TDM2, and TDM3 do not have cyclic redundancy check (CRC) protection, the mobile station may not realize the detection error until descrambling the PBCCH, therefore unnecessarily prolonging the system acquisition time.

SUMMARY OF THE INVENTION

Representative embodiments of the present invention provide methods for detecting information. These methods include receiving enabling information from a serving sector related to how to reconstruct a second and third acquisition pilot (TDM2 and TDM3) and a primary broadcast control channel (PBCCH) of a neighboring sector, wherein said TDM2 and TDM3 are phase-shifted according to said information under detection. The methods also include reconstructing said TDM2, TDM3, and PBCCH of said neighboring sector using said enabling information without applying said phase-shifts on said reconstructed TDM2 and TDM3, receiving said TDM2, TDM3, and PBCCH from said neighboring sector, and correlating said reconstructed TDM2, TDM3, and PBCCH with said received TDM2, TDM3, and PBCCH, respectively. The methods also include generating a plurality of phase correlation signals between at least one pair of: said correlated PBCCH and said correlated TDM3; said correlated PBCCH and said correlated TDM2; and said correlated TDM2 and said correlated TDM3 with phase-shifts applied on said correlated TDM2 and said correlated TDM3 for each hypothesized value of said information under detection according to a set of transmission rules, which are the phase-shift mapping rules applied on said TDM2 and TDM3. The methods further include combining one or more phase correlation signals into a combined signal for each hypothesized value of said information under detection. Once the signal is combined, said information under detection is determined based on said combined signal.

Additional representative embodiments of the present invention provide transmitters that are made up of a first waveform generator to generate a second acquisition pilot (TDM2) based on a first set of information bits, a first modulator to shift a first phase of said TDM2 according to other sector interference (OSI) information, wherein a number of angles of said first modulator corresponds to a number of states in said OSI information, a second waveform generator to generate a third acquisition pilot (TDM3) based on a second set of information bits, a second modulator to shift a second phase of said TDM3 according to said OSI information, wherein a number of angles of said second modulator corresponds to said number of states in said OSI information, and a time multiplexer to multiplex said phase-shifted TDM2 and TDM3 with one or more additional symbols in a superframe preamble.

Additional representative embodiments of the present invention provide computer program products having computer readable medium with computer program logic recorded thereon. These computer program products include code for receiving enabling information from a serving sector related to how to reconstruct a second and third acquisition pilot (TDM2 and TDM3) and a primary broadcast control channel (PBCCH) of a neighboring sector, wherein said TDM2 and TDM3 are phase-shifted according to at least one information under detection, code for reconstructing said TDM2, TDM3, and PBCCH of said neighboring sector using said enabling information without applying said phase-shifts on said reconstructed TDM2 and TDM3, code for receiving said TDM2, TDM3, and PBCCH from said neighboring sector, and code for correlating said reconstructed TDM2, TDM3, and PBCCH with said received TDM2, TDM3, and PBCCH. They also include code for generating a plurality of phase correlation signals between at least one pair of: said correlated PBCCH and said correlated TDM3; said correlated PBCCH and said correlated TDM2; and said correlated TDM2 and said correlated TDM3 with phase-shifts applied on said correlated TDM2 and said correlated TDM3 for each hypothesized value of said information under detection according to a set of transmission rules, which are the phase-shift mapping rules applied on said TDM2 and TDM3. They also include code for combining one or more said phase correlation signals into a combined signal for each hypothesized value of said information under detection. The computer program products also include code for determining said information under detection based on said combined signal.

Additional representative embodiments of the present invention provide methods that include indicating at least timing, channel bandwidth, and system synchronicity in a first acquisition pilot (TDM1), sequencing said TDM1 using one of a plurality of time-repeating sequences, forming a second and third acquisition pilot (TDM2 and TDM3) using information selected according to said system synchronicity, and transmitting a superframe preamble including said TDM1, TDM2, and TDM3.

Additional representative embodiments of the present invention provide computer program products having computer readable medium with computer program logic recorded thereon. These computer program products include code for indicating at least timing, channel bandwidth, and system synchronicity in a first acquisition pilot (TDM1), code for sequencing said TDM1 using one of a plurality of time-repeating sequences, code for forming a second and third acquisition pilot (TDM2 and TDM3) using information selected according to said system synchronicity, and code for transmitting a superframe preamble including said TDM1, TDM2, and TDM3.

Additional representative embodiments of the present invention provide computer program products having computer readable medium with computer program logic recorded thereon. These computer program products include code for receiving said superframe preamble by a mobile station, code for detecting said system synchronicity in said TDM1, and code for decoding information in said TDM2 and TDM3 according to said detected synchronicity.

Additional representative embodiments of the present invention provide methods that include receiving said superframe preamble by a mobile station, detecting said system synchronicity in said TDM1, and decoding information in said TDM2 and TDM3 according to said detected synchronicity.

Additional representative embodiments of the present invention provide methods for detecting a decoding error in one or more acquisition pilots of a superframe preamble. These methods include repeating a plurality of information bits of one of said one or more acquisition pilots, said repeated plurality of information bits forming a transmit acquisition pilot, generating a scrambling sequence using at least one information bit carried by another of said one or more acquisition pilots, wherein said one of said one or more acquisition pilots and said another are not the same, scrambling said transmit acquisition pilot using said scrambling sequence, and transmitting said superframe preamble including said scrambled transmit acquisition pilot.

Additional representative embodiments of the present invention provide computer program products having computer readable medium with computer program logic recorded thereon. These computer program products include code for repeating a plurality of information bits of one of said one or more acquisition pilots, said repeated plurality of information bits forming a transmit acquisition pilot, code for generating a scrambling sequence using at least one information bit carried by another of said one or more acquisition pilots, wherein said one of said one or more acquisition pilots and said another are not equal, code for scrambling said transmit acquisition pilot using said scrambling sequence, and code for transmitting said superframe preamble including said scrambled transmit acquisition pilot.

Additional representative embodiments of the present invention provide methods that include receiving a superframe preamble by a mobile station, detecting one or more information bits carried on one of said one or more acquisition pilots, generating a descrambling sequence based on said one or more information bits, and descrambling a transmit acquisition pilot using said descrambling sequence, where the transmit acquisition pilot comprises a repeated plurality of information bits from another of said one or more acquisition pilots, wherein said one or said one or more acquisition pilots and said another are not the same. The methods also include correlating a first portion of said transmit acquisition pilot with a second portion of said transmit acquisition pilot and declaring an error in said detecting said one or more information bits responsive to results of said correlating being less than a predetermined threshold.

Additional representative embodiments of the present invention provide computer program products having computer readable medium with computer program logic recorded thereon. These computer program products include code for receiving a superframe preamble by a mobile station, code for detecting one or more information bits carried on one of said one or more acquisition pilots, code for generating a descrambling sequence based on said one or more information bits, and code for descrambling a transmit acquisition pilot using said descrambling sequence, where the transmit acquisition pilot comprises a repeated plurality of information bits from another of said one or more acquisition pilots, wherein said one or said one or more acquisition pilots and said another are not the same. The computer program products also include code for correlating a first portion of said transmit acquisition pilot with a second portion of said transmit acquisition pilot and code for declaring an error in said detecting said one or more information bits responsive to results of said code for correlating being less than a predetermined threshold.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A is a diagram illustrating a superframe preamble configured according to one aspect of the present invention;

FIG. 3B is a diagram illustrating the detailed information bits in each of acquisition pilots TDM1-TDM3, as presented in FIG. 3A;

FIG. 3C is a diagram illustrating the detailed information bits in each of acquisition pilots TDM1-TDM3 of a superframe preamble in another system configured according to one embodiment of the present invention;

DETAILED DESCRIPTION OF ILLUSTRATIVE EMBODIMENTS

Figure 1:
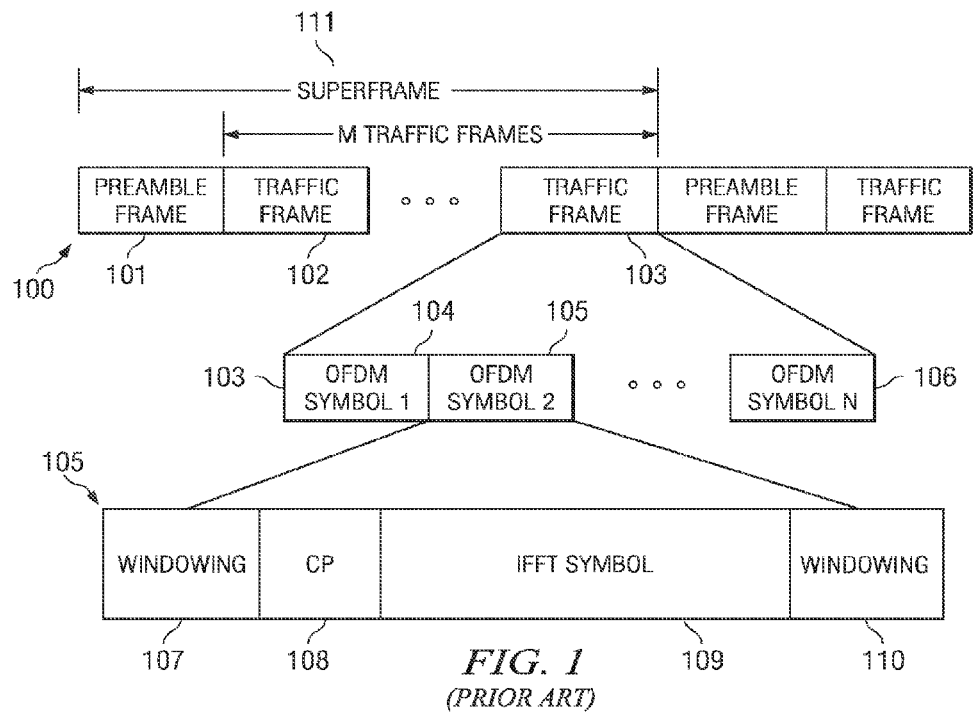
FIG. 1 is a block diagram illustrating a typical example of a framing structure in an OFDM or OFDMA-based wireless communications system.
Figure 2:
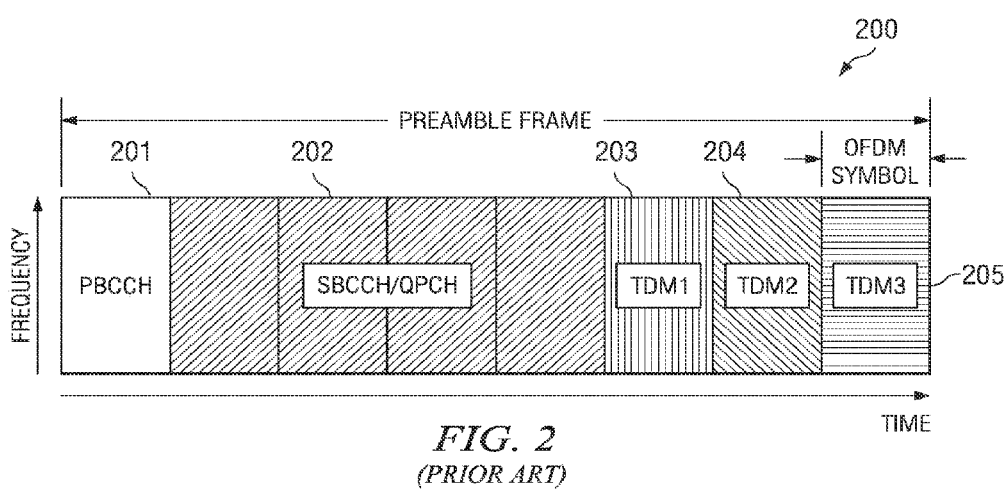
FIG. 2 is a diagram illustrating an exemplary OFDM preamble structure proposed for the air interface evolution (AIE) of cdma2000 standards.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention provides a unique method and system for achieving system acquisition and other signaling purposes using the preamble in an OFDM or OFDMA based communication system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

FIG. 3A is a diagram illustrating superframe preamble 300 configured according to one aspect of the present invention. Preamble 300 comprises eight OFDM symbols, including, in the order of transmitted time, one OFDM symbol for the primary broadcast control channel, PBCCH 301, 4 OFDM symbols for the SBCCH in the even-numbered superframes and the QPCH in the odd-numbered superframes, SBCCH/QPCH 302, one OFDM symbol for the acquisition pilot, TDM3 303, one OFDM symbol for the acquisition pilot, TDM2 304, and one OFDM symbol for the acquisition pilot, TDM1 305. It should be well known to one of ordinary skill in the art that the SBCCH may also be carried on the odd-numbered superframes and the QPCH may also be carried on the even-numbered superframes.

Acquisition pilot TDM1 305 provides the channel bandwidth, timing, and the CP length or the Sync/Async bit. Acquisition pilot TDM2 304 carries a portion of the Pilot-Phase or PilotPN bits such that acquisition pilot TDM2 304 sequence before scrambling possesses the time repetition property. The time-repeated sequence of acquisition pilot TDM2 304 is further scrambled with a scrambling sequence seeded with the CP length or the Sync/Async bit. If the timing acquisition is a false alarm or the CP length or the Sync/Async bit is detected in error, the descrambled version of acquisition pilot TDM2 304 sequence at the mobile station will present a poor correlation between the first half portion and the second half portion. The mobile station may then compare this correlation against a predetermined threshold to declare if the timing acquisition is a false alarm or the CP length or the Sync/Async bit has been detected in error.

Acquisition pilot TDM3 303 carries the remaining portion of the PilotPhase or PilotPN bits and some other information bits, for example, the Sync/Async bit if the Sync/Async bit is not carried in the TDM1 305, or the CP length bits if the CP length bits are not carried in the TDM1 305. In the case where the CP length bits are not carried in TDM1 305, the CP length used on TDM1 305 and TDM2 304 is a fixed and conservative value that is known to the mobile station, while the CP length on the rest of preamble 300 and all traffic frames are flexible and are indicated by TDM3 303. One detailed method for indicating flexible CP length has been disclosed in co-pending, commonly-assigned U.S. patent application Ser. No. 11/754,622, filed on May 29, 2007, entitled "SYSTEM FOR FLEXIBLE CYCLIC PREFIX LENGTH FOR PREAMBLE SYMBOLS IN AN OFDM BASED COMMUNICATION SYSTEM", by Yunsong Yang, Jianmin Lu, and Mingyang Sun, which claims the benefits of U.S. Provisional Application Ser. No. 60/815,958, filed on Jun. 22, 2006; and Ser. No. 60/820,939, filed on Jul. 31, 2006, the disclosures of which are hereby expressly incorporated by reference herein.

Similarly to TDM2 304 sequence, acquisition pilot TDM3 303 sequence can also be repeated in time before being scrambled with a scrambling sequence. This scrambling sequence for TDM3 303 is generated with the information bits carried by acquisition pilot TDM2 304. Therefore, the mobile station can use the correlation method as described above to check if TDM2 304 is decoded correctly.

FIG. 3B is a diagram illustrating the detailed information bits in each of acquisition pilots TDM1-TDM3, as presented in FIG. 3A. TDM3 303 carries, in the synchronous case: a 2-bit CP length, a 1-bit Half-Duplex bit; a 1-bit Frequency Re-Use on Preamble bit, and 3 MSBs of a PilotPhase, or, in the asynchronous case: a 2-bit CP length, a 1-bit Half-Duplex bit; 4 LSBs of system time; and 1 MSB of PilotPN. TDM2 304 carries, in the synchronous case: 6 LSBs of PilotPhase, or, in the asynchronous case: 8 LSBs of PilotPN. TDM1 305 carries 1 of 6 sequences to indicate three possible bandwidths; and a 1-bit Sync/Async bit.

In this preferred embodiment, acquisition pilot TDM1 305 indicates the three possible channel bandwidths (i.e. 1.25 MHz, 2.5 MHz, and 5 MHz) and 1-bit Sync/Async bit using one of total 6 possible sequences, such as Walsh sequences, general chirp-like (GCL) sequences, pseudo-noise (PN) sequences, Chu sequences, Frank-Zadoff sequences, or any sequences that have low cross-correlation.

Because, in the AIE system, the 1.25 MHz and 2.5 MHz bandwidth options are mainly for backward compatibility with the exist deployment of the cdma2000 family of standards and existing cdma2000 systems are already synchronous systems, the asynchronous operation for the 1.25 MHz and 2.5 MHz bandwidth options may be eliminated, thereby further reducing the number of possible acquisition pilot TDM1 sequences from 6 to 4.

One advantage of carrying the Sync/Async bit in TDM1 305 is that the remaining information bits carried by TDM2 304 and TDM3 303 may be minimized based on the synchronicity of the system. For example, if the system is a synchronous system, acquisition pilot TDM2 304 indicates only a portion of the sector PilotPhase, for example the 6 LSBs of the sector PilotPhase, in a Walsh sequence that is further scrambled with the scrambling sequence seeded with the Sync/Async value as indicated in TDM1 305. The 64-ary Walsh sequence is repeated by a factor of 2, 4, or 8 for a 1.25 MHz, 2.5 MHz, or 5 MHz system, respectively, because the FFT size for a 1.25 MHz, 2.5 MHz, or 5 MHz system is 128, 256, or 512, respectively.

Meanwhile, acquisition pilot TDM3 303 contains 7 bits in a 128-ary Walsh sequence, including 2-bit for CP length, 1-bit for Half-Duplex, 1-bit for Frequency Reuse on Preamble, and the 3 most significant bits (MSBs) of the sector PilotPhase. The 128-ary Walsh sequence is repeated by a factor of 2 or 4 for a 2.5 MHz or 5 MHz system, respectively. If the system is an asynchronous system, the acquisition pilot TDM2 304 indicates the 8 least significant bits (LSBs) of the sector PilotPN in a Walsh sequence that is further scrambled with the scrambling sequence seeded with the Sync/Async value as indicated in TDM1 305. The 256-ary Walsh sequence is repeated by a factor of 2 for a 5 MHz system, respectively.

Acquisition pilot TDM3 303 contains 8 bits in a 256-ary Walsh sequence, including 2-bit for CP length, 1-bit for Half-Duplex, 4-bit for the system time, and 1 most significant bit (MSB) of the sector PilotPN. The 256-ary Walsh sequence is also repeated by a factor of 2 for a 5 MHz system, respectively. The repeated Walsh sequence on TDM2 304 is further scrambled with the seed of Sync/Async bit as indicated in TDM1 305. The repeated Walsh sequence on TDM3 303 is further scrambled with the seed of the information bit carried on TDM2 304.

The embodiment as illustrated in FIG. 3B and described above can also be slightly modified. In an example to further illustrate the concepts and techniques disclosed in the present invention: acquisition pilot TDM1 carries the Sync/Async bit to indicate if the system is synchronous or asynchronous; if the system is synchronous, TDM2 304 carries the 6, 7, or 8 LSBs of the sector PilotPhase in a 64-ary, 128-ary, or 256-ary Walsh sequence for a 1.25 MHz, 2.5 MHz, or 5 MHz system, respectively; if the system is asynchronous, TDM2 304 carries the 8 LSBs of the sector PilotPN in a 256-ary Walsh sequence for a 5 MHz system, assuming there is no need for an asynchronous 1.25 MHz or 2.5 MHz system. Therefore, the Walsh sequence is repeated at least once. The repeated TDM2 304 sequence is scrambled with a scrambling sequence using the Sync/Async bit on TDM1 305 as the scrambling seed. TDM3 303 carries the remaining bits of the sector PilotPhase or PilotPN, in addition to the other fields illustrated in FIG. 3B. TDM3 303 Walsh sequence may also further be scrambled with the seed of the information bits carried on TDM2 304.

This modified approach maximizes the number of information bits carried on TDM2 304 while maintaining the repetitive property of the sequences, thereby reducing the probability that two geographically adjacent sectors will carry the same information bits on their respective TDM2.

If two adjacent sectors carry the same information bits on their respective TDM2, the waveforms of their respective TDM2 will be the same and may collide with each other over the air, thereby degrading the decoding performance of the OSI information that is dynamically transmitted by each sector using their respective TDM2 and TDM3. For the same reason, it is preferable not to carry the CP length information on the TDM2 even though it is possible to do so. Moreover, if performance of TDM1 305 is not a concern, the CP length information may also be added on TDM1 305, in addition to the Sync/Aync bit. However, to balance the loading and decoding performance of TDM1 305, TDM2 304, and TDM3 303, it is preferable to carry the CP length on TDM3 303 in the embodiments described above.

FIG. 3C is a diagram illustrating the detailed information bits in each of acquisition pilots TDM1-TDM3 of a superframe preamble in another system configured according to one embodiment of the present invention. In this alternative embodiment, acquisition pilot TDM1 305 indicates the 3 possible channel bandwidths (i.e. 1.25 MHz, 2.5 MHz, and 5 MHz) and 2-bit CP length information using one of total 12 possible sequences. Acquisition pilot TDM2 304 indicates the 7 LSBs of the sector PilotPhase in the Walsh sequence that is further scrambled with the scrambling sequence seeded with the CP value as indicated in TDM1 305. The 128-ary Walsh sequence is repeated by a factor of 2 or 4 for a 2.5 MHz or 5 MHz system, respectively. Acquisition pilot TDM3 303 contains 8 bits in a 256-ary Walsh sequence, including a 1-bit for Sync/Async bit, 1-bit for the Half-Duplex bit, and 2 MSBs of the sector PilotPhase. The 4 remaining bits indicate the 4 LSBs of the system time if the system is asynchronous, i.e., Sync/Async bit='0', or indicate the 1-bit Frequency Re-Use on Preamble bit 3 reserved bits if the system is synchronous, i.e., Sync/Async bit='1'. Here, the 256-ary Walsh sequence is also repeated by a factor of 2 for a 5 MHz system.

In the detection of OSI information, several methods and procedures have been proposed. These procedures may be coherent in nature, in which a common, known signal is used to detect the OSI information, or non-coherent, in which the OSI information is detected without a common reference signal. While coherent systems generally provide good detection accuracy, the complexity of the systems is typically greater than non-coherent systems. Various additional and/or alternative embodiments of the present invention provide for a non-coherent means for detecting additional information, including OSI information that experiences detection accuracy along the lines of a coherent system without adding complexity to the mobile stations operating in the embodied systems.

Figure 4:
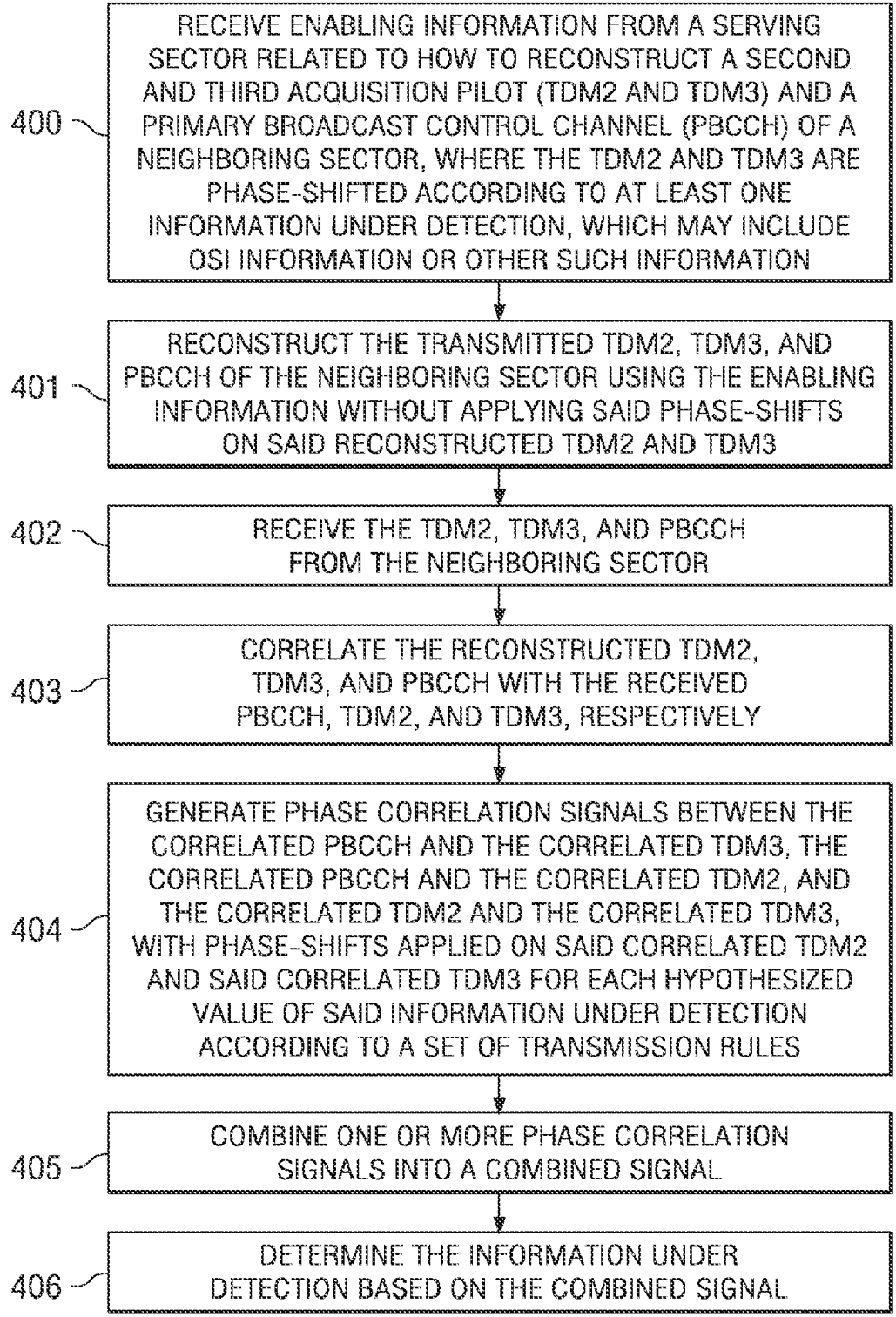
FIG. 4 is a flowchart illustrating example steps executed to implement one embodiment of the present invention.

FIG. 4 is a flowchart illustrating example steps executed to implement one embodiment of the present invention. In step 400, certain enabling information is received from a serving sector related to how to construct a second and third acquisition pilot (TDM2 and TDM3) and a primary broadcast control channel (PBCCH) of a neighboring sector, where the TDM2 and TDM3 are phase-shifted according to the information under detection, which may include OSI information or other such information. The TDM2, TDM3, and PBCCH of the neighboring sector are reconstructed, in step 401, using said enabling information without applying said phase-shifts on said reconstructed TDM2 and TDM3. The TDM3, TDM2, and PBCCH are received by the mobile station from the neighboring sector in step 402. In step 403, the reconstructed TDM2, TDM3, and PBCCH are correlated with the received TDM2, TDM3, and PBCCH, respectively. In step 404, a plurality of phase correlation signals are generated between at least one pair of: the correlated PBCCH and the correlated TDM3; the correlated PBCCH and the correlated TDM2; and the correlated TDM2 and the correlated TDM3, for each hypothesized value of said information under detection according to a set of transmission rules, which are the phase-shift mapping rules applied on said TDM2 and TDM3. One or more said phase correlation signals are then combined into a combined signal for each hypothesized value of said information under detection, in step 405. Said information under detection is then determined, in step 406, based on the combined signal.

The received signals are represented by:

$$W_{PBCCH\_rx} = H \cdot W_{PBCCH\_tx} + n$$

$$W_{TDM\,2\_rx} = H \cdot W_{TDM\,2\_tx} \cdot PhaseShift_{TDM2}(OSI) + n$$

$$W_{TDM\,3\_rx} = H \cdot W_{TDM\,3\_tx} \cdot PhaseShift_{TDM3}(OSI) + n$$

Where $W_{PBCCH\_rx}$, $W_{TDM\,2\_rx}$, and $W_{TDM\,3\_rx}$ denote the received signals of PBCCH, TDM2, and TDM3, respectively; H denotes the channel response; $W_{PBCCH\_tx}$ denotes the transmitted signal of PBCCH; $W_{TDM\,2\_rx}$ and $W_{TDM\,3\_rx}$ denote the transmitted signals of TDM2 and TDM3, respectively, without the phase shifts by the transmitted OSI; PhaseShift$_{TDM2}$(OSI) and PhaseShift$_{TDM3}$(OSI) denote the phase shifts applied on the TDM2 and TDM3 according to each respective mapping rules, given a particular OSI value; n demotes the noise. Therefore, the receiver correlates the received signals with the reconstructed transmitted signals over the length of each signal (i.e. 1) as follows:

$$C_{PBCCH} = \sum^{l} \frac{W_{PBCCH\_rx}}{W_{PBCCH\_tx}} = H + \tilde{n}$$

$$C_{TDM2} = \sum^{l} \frac{W_{TDM2\_rx}}{W_{TDM2\_tx}} = H \cdot PhaseShift_{TDM2}(OSI) + \tilde{n}$$

$$C_{TDM3} = \sum^{l} \frac{W_{TDM3\_rx}}{W_{TDM3\_tx}} = H \cdot PhaseShift_{TDM3}(OSI) + \tilde{n}$$

If the transmitted signals of PBCCH, TDM2, and TDM3 have unit amplitude and are Binary Phase Shift Keying (BPSK) modulated, the correlation process can be as simple as the inner products of vectors $W_{PBCCH\_tx}$ and $W_{PBCCH\_rx}$, $W_{TDM\,2\_tx}$, of vectors $W_{TDM\,2\_tx}$ and $W_{TDM\,2\_rx}$, and of vectors $W_{TDM\,3\_tx}$ and $W_{TDM2\_rx}$.

Conventionally, in the next step, the receiver computes a phase correlation signal as:

$$S_{TDM2\_TDM3}(i) = \mathrm{real}\left(\frac{C_{TDM2}}{PhaseShift_{TDM2}(OSI(i))} \cdot conj\left(\frac{C_{TDM3}}{PhaseShift_{TDM3}(OSI(i))}\right)\right)$$

for each hypothesized OSI values: OSI(i), where real( ) denotes the function that takes the real part of a complex number; conj( ) denotes the function that takes the conjugate of a complex number. When a hypothesized OSI(i) is truly the transmitted OSI, the corresponding $S_{TDM\,2\_TDM\,3}(i)$=real (H·conj(H)+[|$]$^$$[|$]$^A$\hat{x}\hat{n}$)=$\|H\|^2$+real([|$]$^$$ [|$]$^A$\hat{x}\hat{n}$), therefore would yield higher value than the other OSI(i) hypotheses. Therefore, the receiver chooses the index i that yields the highest $S_{TDM\,2\_TDM\,3}(i)$ as the detected index for OSI value.

In selected additional and/or alternative embodiments of the present invention, the receiver further computes the phase correlation signal as:

$$S_{PBCCH\_TDM2}(i) = \mathrm{real}\left(\frac{C_{TDM2}}{PhaseShift_{TDM2}(OSI(i))} \cdot conj(C_{PBCCH})\right)$$

$$S_{PBCCH\_TDM3}(i) = \mathrm{real}\left(\frac{C_{TDM3}}{PhaseShift_{TDM3}(OSI(i))} \cdot conj(C_{PBCCH})\right)$$

for each hypothesized OSI values: OSI(i). Then, the receiver, in a first combining embodiment, may combine $S_{TDM\,2\_TDM\,3}(i)$ and $S_{PBCCH\_TDM\,2}(i)$; or, in a second embodiment, combine $S_{TDM\,2\_TDM\,3}(i)$ and $S_{PBCCH\_TDM\,3}(i)$; or, in a third embodiment, combine $S_{PBCCH\_TDM\,2}(i)$ and $S_{PBCCH\_TDM\,3}(i)$; or, in a fourth embodiment, combine all three $S_{TDM2\_TDM3}(i)$, $S_{PBCCH\_TDM2}(i)$ and $S_{PBCCH\_TDM3}(i)$, for each i. Finally, the receiver chooses the index i that yields the highest combined value as the detected index for OSI value, for any particular embodiment that is implemented. The combining allows the useful signals to be added coherently while the noise is added non-coherently, thereby producing better decoding results than the conventional methods. Therefore, the fourth embodiment that combines all three signals naturally gives a better result among the four embodiments for combining, as described above, and is the preferred mode of operation for the enhancement of OSI decoding.

It should be well known to those with ordinary skills in the art that the benefits of the technique of the non-coherent detection of the OSI by combining the PBCCH with the TDM2 and TDM3 is independent of techniques for which information bits are carried by the TDM1, TDM2, and TDM3, as illustrated above. Thus, for the purpose of combining the PBCCH with the TDM2 and TDM3, the locations of the TDM1, TDM2, and TDM3 in the preamble do not have to be the same as illustrated in FIG. 3. For this purpose, the design principle is to try to keep the PBCCH, TDM2, and TDM3 as close as possible. Currently, PBCCH 301 is transmitted in the first OFDM symbol of preamble 300, as illustrated in FIG. 3, to allow sufficient time for the automatic gain control (AGC) circuitry on the receiver of an idle mobile station to settle properly before that mobile station starts to listen to the QPCH channel.

It should be well known to those with ordinary skills in the art that a non-coherent OSI detection method using the combined SBCCH 302, TDM2 304, and TDM3 303 during the even-numbered superframes may also be possible if the information is provided to the mobile station to reconstruct the transmitted waveform of the SBCCH 302 from the neighboring sectors. However, because the information content in PBCCH is more static (such as the number of guard tones) or more predictable (e.g. the superframe index in PBCCH increases every superframe in a very predictable manner) than the information content in SBCCH, it is preferable to use the PBCCH.

According to yet another aspect of the present invention, in addition to the OSI information, other types of information that may change dynamically can be modulated on at least two acquisition pilots using deferential phase modulation. Those other types of information may include but not limited to the reverse link loading indication. The reverse link loading indication can be represented in different forms, such as the reverse activity bit (RAB), the reverse link load control bit, the reverse link total rise over thermal (IoT), and the like.

Figure 5A:
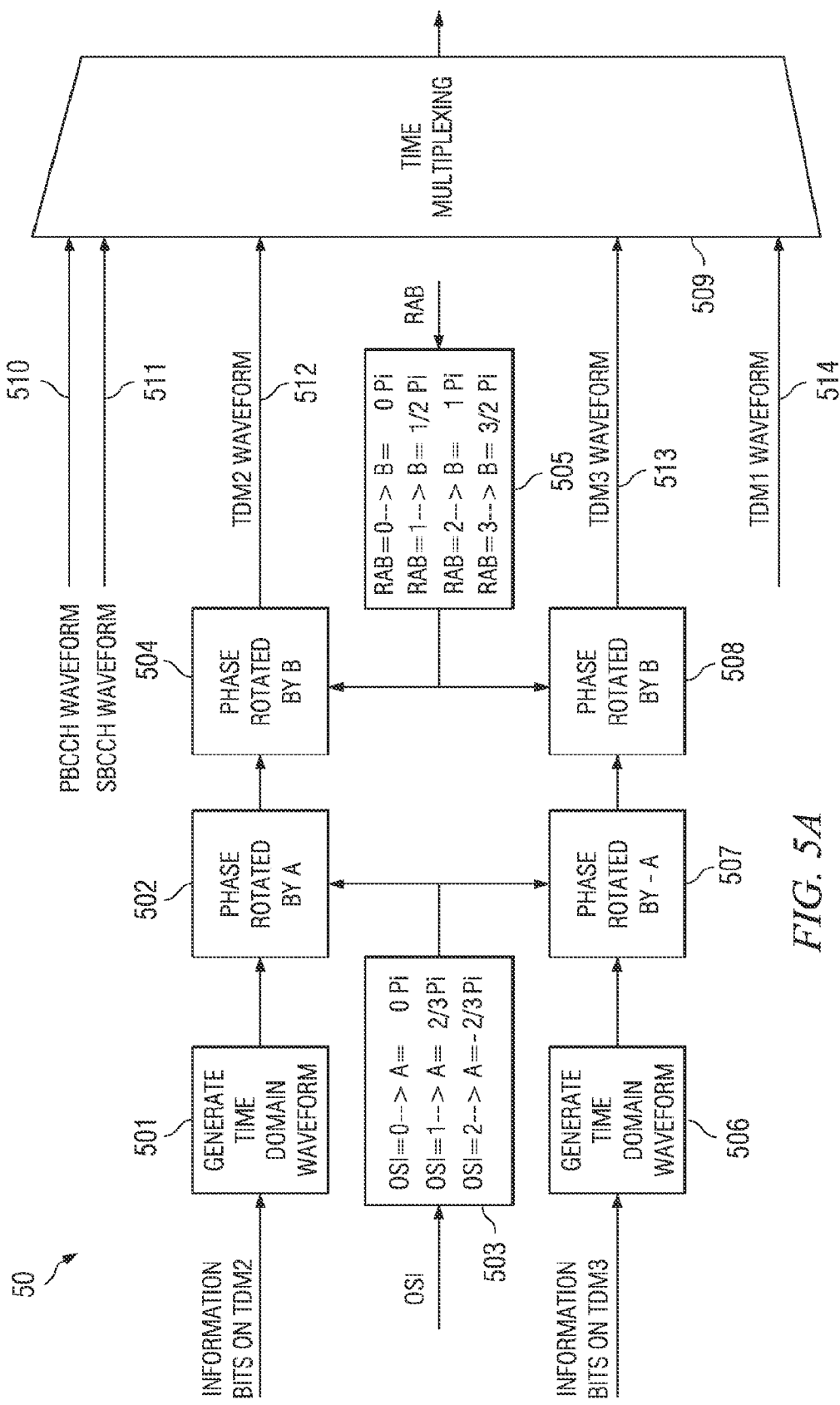
FIG. 5A is a block diagram illustrating a transmitter configured according to one embodiment of the present invention.

FIG. 5A is a block diagram illustrating transmitter 50 configured according to one embodiment of the present invention. Transmitter 50 modulates more than one type of dynamic system parameters on the acquisition pilot TDM2 and TDM3 using differential phase modulation. For purposes of the presently-described example, transmitter 50 uses a 3-state OSI and a 4-state RAB. The initial time domain waveform of TDM2 is generated by waveform generator 501 using the information bits carried on TDM2 as inputs. In one example embodiment, waveform generator 501 may include a Walsh sequence generator that generates a Walsh sequence using the information bits on TDM2, an FFT element that carries out the FFT operation on the Walsh sequence, a spectrum shaping element that sets the guard tones in the FFT-transformed sequence of the Walsh sequence to zero power, an IFFT element that carries out the IFFT operation on the FFT-transformed and spectrum-shaped sequence of the Walsh sequence, a CP insertion element that copies the last portion of the IFFT-transformed sequence and inserts the copy in front the IFFT-transformed sequence, a scrambling element that further scrambles the CP-added sequence with a scrambling sequence that is generated with a scrambling seed.

The scrambling seed of waveform generator 501 comprises the Sync/Async bit on TDM1. In additional and/or alternative embodiments, the scrambling seed may comprise other bits. The TDM2 waveform output of waveform generator 501 is modulated with a phase A by phase modulator 502. Phase A is generated by mapping OSI table 503 with the OSI information as input thereto. For example, an OSI value of "0" is mapped to a value of 0 for phase angle A, an OSI value of "1" is mapped to a value of ⅔π for A, and an OSI value of "2" is mapped to a value of −⅔π for A. The phase rotated TDM2 waveform is further modulated with a Phase B by phase modulator 504. Phase angle B is generated by mapping RAB table 505 with the RAB information as input thereto. For example, a RAB value of "0" is mapped to a value of 0 for B, a RAB value of "1" is mapped to a value of ½π for B, a RAB value of "2" is mapped to a value of π for B, and a RAB value of "3" is mapped to a value of 3/2π for B.

The initial time domain waveform of TDM3 is generated by waveform generator 506 with the information bits carried on TDM3 as inputs. Waveform generator 506 has the same structure as waveform generator 501 except that waveform generator 506 takes the information bits on TDM3 as inputs to generate the Walsh sequence, and takes the information bits on TDM2 as inputs to generate the scrambling sequence. The initial TDM3 waveform is modulated with a phase −A (i.e. minus A) by phase modulator 507, where A is the phase applied on the TDM2 sequence and is generated by mapping OSI table 503 with OSI information as input. The phase rotated TDM3 waveform is further modulated with the same phase B as TDM2 by phase modulator 508. Final TDM2 waveform 512 and TDM3 waveform 513, output from phase modulators 504 and 508, are then time-multiplexed with the baseband waveforms of PBCCH 510, SBCCH 511, and TDM1 514 by multiplexer 509 to form the preamble.

Because the differential phase rotation between final TDM2 and TDM3 waveforms 504 and 508 is maintained as 0, ⅔π, or −⅔π for an OSI value of "0", "1", or "2", respectively, and is independent of the RAB value, a non-coherent detection scheme using the received TDM2 and TDM3 signals as the reference for each other can be used to detect the phase A, thereby the OSI value may be obtained first at the receiver without knowing the RAB value. The received PBCCH signal is used as reference to the received TDM2 signal to detect the combined phase (A+B). Phase B, thereby the RAB value, can be derived given the combined phase (A+B) and the detected phase A in the previous step. It is also possible to use the received PBCCH signal as reference to the received TDM3 signal to detect the combined phase (B−A) in order to derive the value of B. However, the preferred approach is to use the received PBCCH as reference to TDM2, TDM2 and TDM3 signals as reference to each other, and combine these signals with the specific phase rotation rules on the TDM2 and TDM3. With a total of 12 hypotheses, the mobile station can select the highest combined correlation of the 12 hypotheses as the detected OSI and RAB results.

Figure 5B:
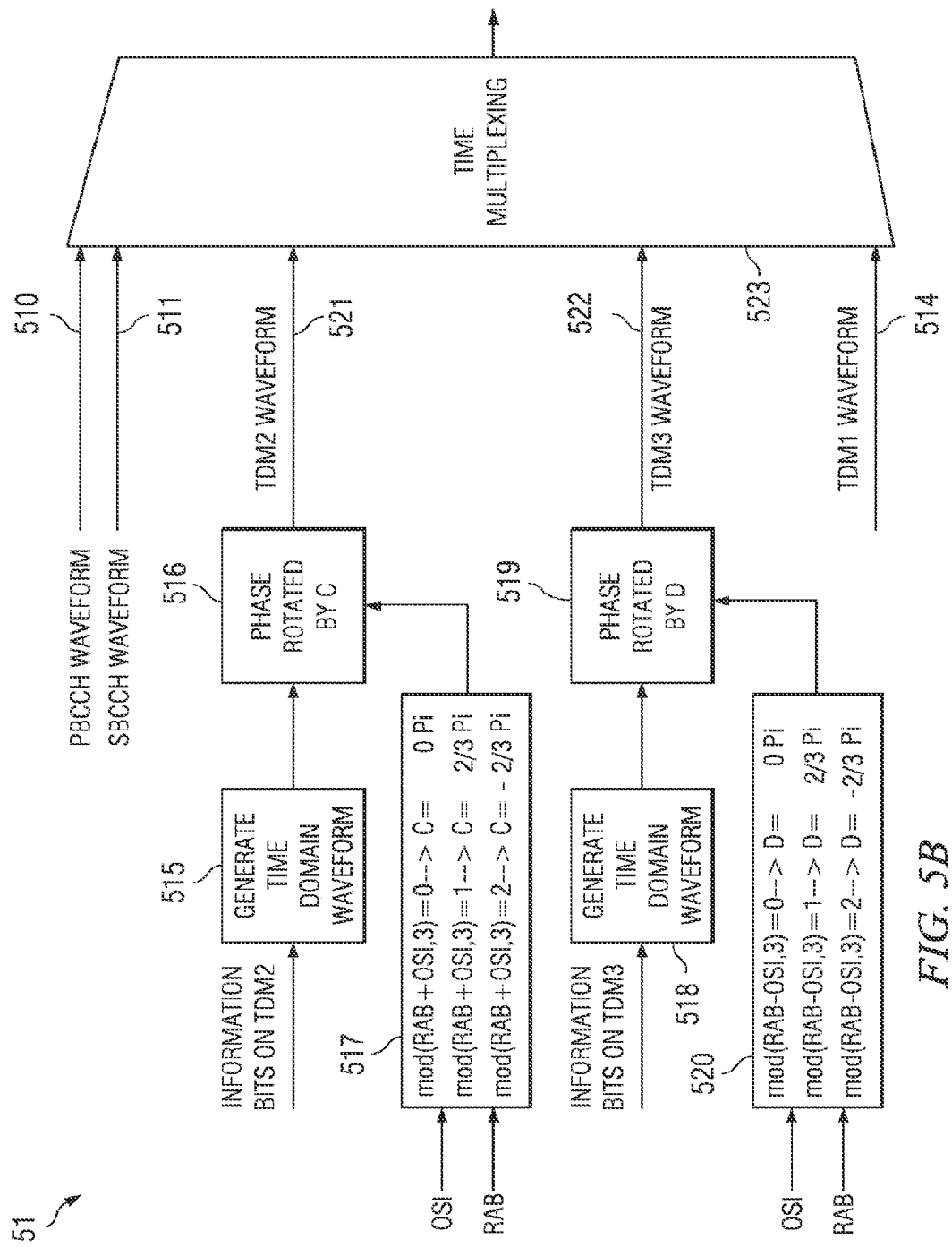
FIG. 5B is a block diagram illustrating a transmitter structure configured according to an additional embodiment of the present invention.

FIG. 5B is a block diagram illustrating transmitter structure 51 configured according to an additional embodiment of the present invention. In contrast to the embodiment described in FIG. 5A, the RAB information has 3 states just as the OSI information. The initial waveforms of the TDM2 and TDM3 are generated by waveform generators 515 and 518, similar as described in FIG. 5A. The values of OSI and RAB are combined into mod(OSI+RAB,3) and mod(OSI−RAB,3), where mod( ) is the modulus function. The output combined values are mapped by combination tables 517 and 520 into respective phase rotations, which are applied on the TDM2 and TDM3 initial waveforms by phase modulators 516 and 519, respectively. Final TDM2 and TDM3 waveforms 521 and 522 output from phase modulators 516 and 519 are time-multiplexed with the baseband waveforms of PBCCH 510, SBCCH 511, and TDM1 514 by multiplexer 523 to form the preamble. The relative phase rotations between TDM2 and TDM3, between TDM2 and PBCCH, and between TDM3 and PBCCH are still the same as the case using the structure illustrated in FIG. 5A. Therefore, the same decoding method as described above can also be used.

It should be noted that the various additional and/or alternative embodiments of the present invention may be used with additional forms of the superframe preamble. It should be obvious to those with ordinary skills in the art that the techniques of enhancing the non-coherent detection of OSI information and the like from the neighboring sector, as described above, can also be used for detecting OSI information and the like from the serving sector of the mobile station.

Figure 6:
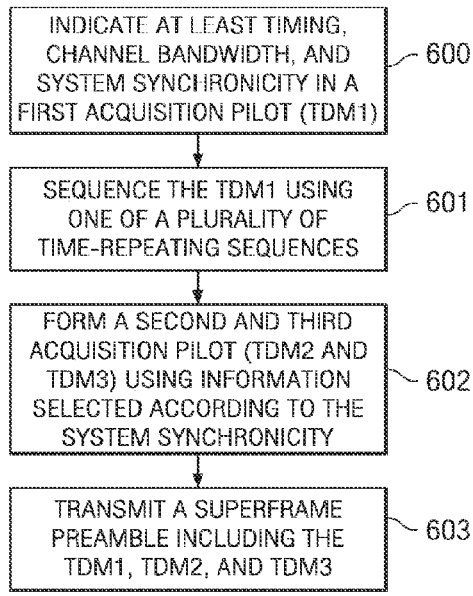
FIG. 6 is a flowchart illustrating example steps executed to implement one embodiment of the present invention.

FIG. 6 is a flowchart illustrating example steps executed to implement one embodiment of the present invention. In step 600, at least timing, channel bandwidth, and system synchronicity are indicated in a first acquisition pilot (TDM1). The TDM1 is sequenced, in step 601, using one of a plurality of time-repeating sequences. A second and third acquisition pilot (TDM2 and TDM3) are formed, in step 602, using information selected according to the system synchronicity. In step 603, a superframe preamble is transmitted including the TDM1, TDM2, and TDM3.

It should be noted that the various additional and/or alternative embodiments of the present invention apply to mobile stations receiving communication formats that are specific and/or different, and that facilitate improved acquisition processing in mobile devices.

Figure 7:
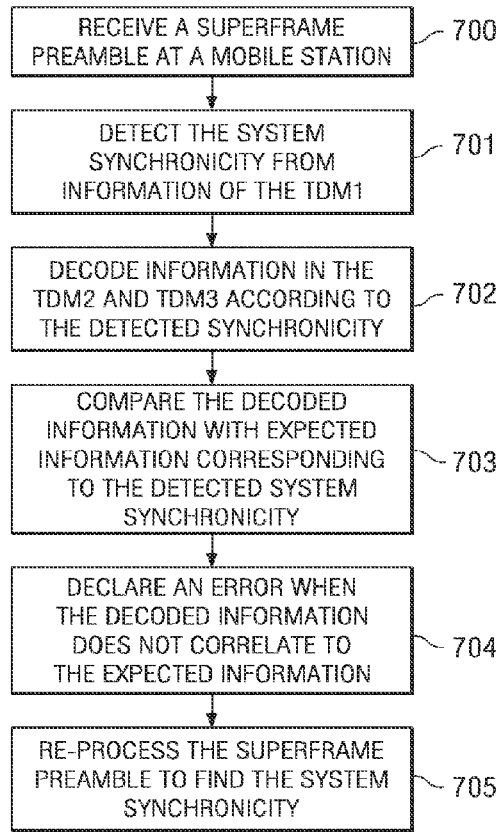
FIG. 7 is a flowchart illustrating example steps executed to implement on embodiment of the present invention.

FIG. 7 is a flowchart illustrating example steps executed to implement on embodiment of the present invention. In step 700, a superframe preamble is received by a mobile station. The system synchronicity is detected, in step 701, from information in TDM1. Information in the TDM2 and TDM3 is decoded, in step 702, according to the detected synchronicity. In step 703, the decoded information is compared with expected information corresponding to the detected system synchronicity. An error is declared, in step 704, when the decoded information does not correlate to the expected information. In step 705, the superframe preamble is re-processed to look for the correct system synchronicity.

Figure 8:
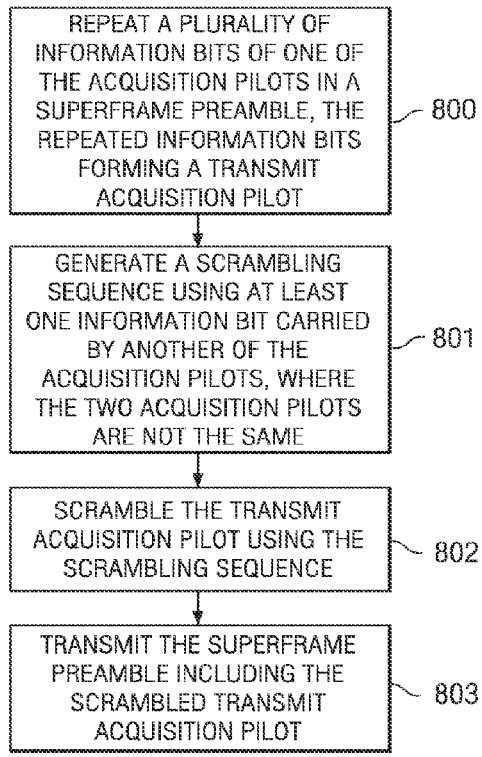
FIG. 8 is a flowchart illustrating example steps executed to implement on embodiment of the present invention.

FIG. 8 is a flowchart illustrating example steps executed to implement on embodiment of the present invention. In step 800, a plurality of information bits of one of the acquisition pilots of a superframe preamble are repeated, the repeated information bits forming a transmit acquisition pilot. A scrambling sequence is generated, in step 801, using at least one information bit carried by another of the acquisition pilots, where the two acquisition pilots are not the same. The transmit acquisition pilot is scrambled, in step 802, using the scrambling sequence. The superframe preamble is then transmitted, in step 803, including the scrambled transmit acquisition pilot.

It should be noted that additional and/or alternative embodiments of the present invention may be applied to improve the error detection during the acquisition process. Instead of having the first error detection occur while descrambling/decoding the PBCCH, error checking may begin during descrambling and decoding of the acquisition pilots, even without CRC protection.

Figure 9:
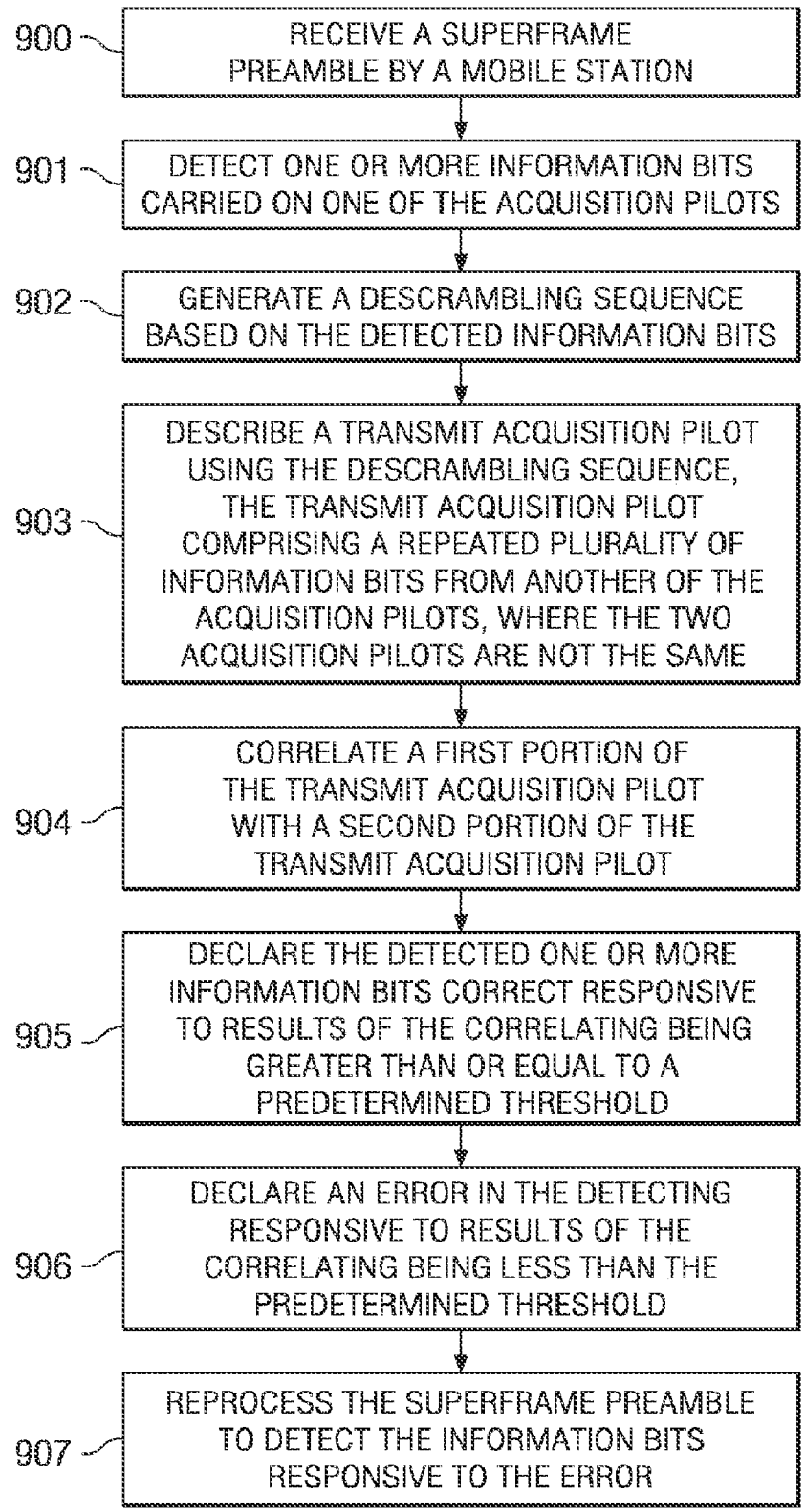
FIG. 9 is a flowchart illustrating example steps executed to implement on embodiment of the present invention.

FIG. 9 is a flowchart illustrating example steps executed to implement on embodiment of the present invention. In step 900, a superframe preamble is received by a mobile station. One or more information bits carried on one of the acquisition pilots are detected in step 901. A descrambling sequence is generated, in step 902, based on the detected information bits. After which, a transmit acquisition pilot is descrambled using the descrambling sequence, in step 903, the transmit acquisition pilot comprising a repeated plurality of information bits from another of the acquisition pilots, where the two acquisition pilots are not the same. A first portion of the transmit acquisition pilot is correlated with a second portion of the transmit acquisition pilot in step 904. The detected information bits are declared correct, in step 905, responsive to results of the correlating being greater than or equal to a predetermined threshold. Otherwise, in step 906, an error is declared in the detecting responsive to results of the correlating being less than the predetermined threshold. If an error has been declared, the superframe preamble is re-processed, in step 907, to detect the information bits responsive to the error.

The various illustrative logical blocks, modules, and circuits described in connection with the embodiment disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

Figure 10:
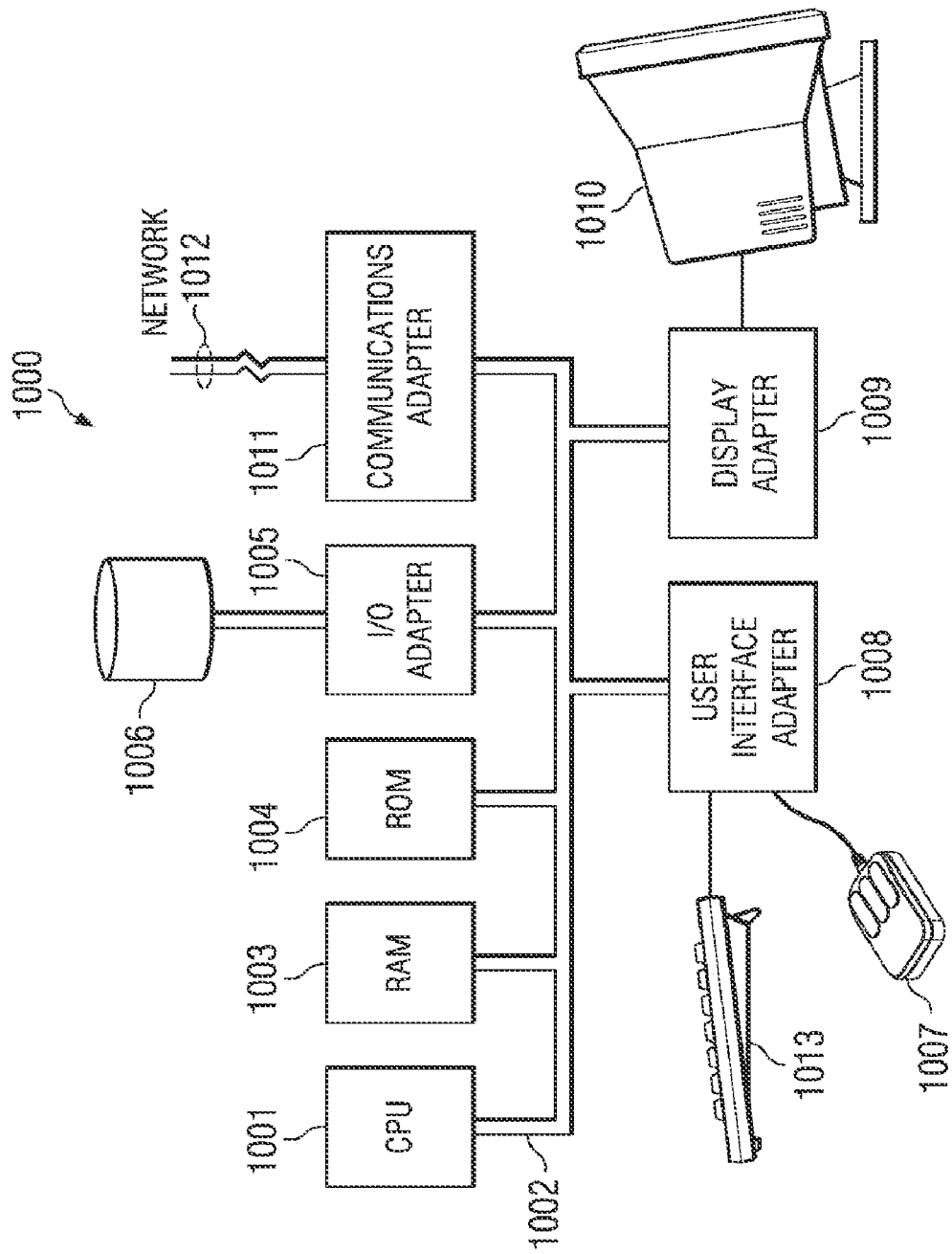
FIG. 10 illustrates a computer system adapted to use embodiments of the present invention.

FIG. 10 illustrates computer system 1000 adapted to use embodiments of the present invention, e.g. storing and/or executing software associated with the embodiments. Central processing unit (CPU) 1001 is coupled to system bus 1002. The CPU 1001 may be any general purpose CPU. However, embodiments of the present invention are not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects storage devices 1006, such as one or more of a hard drive, a CD drive, a floppy disk drive, a tape drive, to computer system 1000. The I/O adapter 1005 is also connected to a printer (not shown), which would allow the system to print paper copies of information such as documents, photographs, articles, and the like. Note that the printer may be a printer (e.g., dot matrix, laser, and the like), a fax machine, scanner, or a copier machine.

The steps of a method or algorithm described in connection with the embodiments disclosed herein may be implemented or performed directly in hardware, in a software module executed by a processor, or in combination of the two. A software module may reside in RAM memory, flash memory, ROM memory, EPROM memory, EEPROM memory, registers, or any other form of storage medium in the art.

It should be well known to those with ordinary skills in the art that the techniques disclosed in the present invention can be used in a frequency division duplex (FDD) system as well as in a time division duplex (TDD) system.

It should be noted that numerous variations and modifications can be made without departing from the spirit of the present invention. Therefore, it should be clearly understood that the form of the present invention described above and shown in the figures of the accompanying drawing is illustrative only and is not intended to limit the scope of the present invention.

Although the present invention and its advantages have been described in detail, it should be understood that various changes, substitutions and alterations can be made herein without departing from the spirit and scope of the invention as defined by the appended claims Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
indicating at least timing, channel bandwidth, and system synchronicity in a first acquisition pilot (TDM1);
sequencing said TDM1 using one of a plurality of time-repeating sequences;
forming a second and third acquisition pilot (TDM2 and TDM3) using information selected according to said system synchronicity, wherein one of said TDM1, TDM2 and TDM3 comprises a cyclic prefix length and another one of said TDM1, TDM2 and TDM3 comprises sync/async information, wherein said TDM2 comprises a first portion of a pilot phase or sector identity information, and wherein said TDM3 comprises a remaining portion of the pilot phase or sector identity info information but does not comprise the first portion; and transmitting a superframe preamble including said TDM1, TDM2, and TDM3.

2. The method of claim 1 further comprising:
receiving said superframe preamble by a mobile station;
detecting said system synchronicity in said TDM1; and
decoding said selected information in said TDM2 and TDM3 according to said detected synchronicity.

3. The method of claim 2 further comprising:
comparing said decoded selected information from expected information corresponding to said detected system synchronicity;
declaring an error when said decoded selected information does not correlate to said expected information; and
re-processing said superframe preamble for said system synchronicity.

4. A computer program product having a non-transitory computer readable medium with computer program logic recorded thereon, said computer program product comprising:
code for indicating at least timing, channel bandwidth, and system synchronicity in a first acquisition pilot (TDM1);
code for sequencing said TDM1 using one of a plurality of time-repeating sequences;
code for forming a second and third acquisition pilot (TDM2 and TDM3) using information selected according to said system synchronicity, wherein one of said TDM1, TDM2 and TDM3 comprises a cyclic prefix length and another one of said TDM1, TDM2 and TDM3 comprises sync/async information, wherein said TDM2 comprises a first portion of a pilot phase or sector identity information, and wherein said TDM3 comprises a remaining portion of the pilot phase or sector identity information but does not comprise the first portion; and
code for transmitting a superframe preamble including said TDM1, TDM2, and TDM3.

5. The computer program product of claim 4 further comprising:
code for receiving said superframe preamble by a mobile station;
code for detecting said system synchronicity in said TDM1; and
code for decoding said selected information in said TDM2 and TDM3 according to said detected synchronicity.

6. The computer program product of claim 5 further comprising:
code for comparing said decoded selected information from expected information corresponding to said detected system synchronicity;
code for declaring an error when said decoded selected information does not correlate to said expected information; and
code for re-processing said superframe preamble for said system synchronicity.

7. A computer program product having a non-transitory computer readable medium with computer program logic recorded thereon, said computer program product comprising:
code for receiving a superframe preamble by a mobile station, wherein said superframe preamble includes first, second and third acquisition pilots (TDM1, TDM2, and TDM3), wherein said TDM1 indicates at least timing, channel bandwidth, and system synchronicity, and wherein said TDM1 is sequenced with one of a plurality of time-repeating sequences;
code for detecting said system synchronicity in said TDM1; and
code for decoding information in said TDM2 and TDM3 according to said detected synchronicity, wherein one of said TDM1, TDM2 and TDM3 comprises a cyclic prefix length and another one of said TDM1, TDM2 and TDM3 comprises sync/async information, wherein said TDM2 comprises a first portion of a pilot phase or sector identity information, and wherein said TDM3 comprises a remaining portion of the pilot phase or sector identity information but does not comprise the first portion.

8. The computer program product of claim 7 further comprising:
code for comparing said decoded information with expected information corresponding to said detected system synchronicity;
code for declaring an error when said decoded information does not correlate to said expected information; and
code for re-processing said superframe preamble for said system synchronicity.

9. A method comprising:
receiving a superframe preamble by a mobile station, wherein said superframe preamble includes first, second and third acquisition pilots (TDM1, TDM2, and TDM3), wherein said TDM1 indicates at least timing, channel bandwidth, and system synchronicity, and wherein said TDM1 is sequenced with one of a plurality of time-repeating sequences;
detecting said system synchronicity in said TDM1; and
decoding information in said TDM2 and TDM3 according to said detected synchronicity, wherein one of said TDM1, TDM2 and TDM3 comprises a cyclic prefix length and another one of said TDM1, TDM2 and TDM3 comprises sync/async information, wherein said TDM2 comprises a first portion of a pilot phase or sector identity information, and wherein said TDM3 comprises a remaining portion of the pilot phase or sector identity information but does not comprise the first portion.

10. The method of claim 9 further comprising:
comparing said decoded information with expected information corresponding to said detected system synchronicity;
declaring an error when said decoded information does not correlate to said expected information; and
re-processing said superframe preamble for said system synchronicity.

11. The method of claim 1, wherein said TDM1 comprises the cyclic prefix length and said TDM3 comprises the sync/async information.

12. The method of claim 1, wherein said TDM3 comprises the cyclic prefix length and said TDM1 comprises the sync/async information.

13. The computer program product of claim 4, wherein said TDM1 comprises the cyclic prefix length and said TDM3 comprises the sync/async information.

14. The computer program product of claim 4, wherein said TDM3 comprises the cyclic prefix length and said TDM1 comprises the sync/async information.

15. The computer program product of claim 7, wherein said TDM1 comprises the cyclic prefix length and said TDM3 comprises the sync/async information.

16. The computer program product of claim 7, wherein said TDM3 comprises the cyclic prefix length and said TDM1 comprises the sync/async information.

17. The method of claim 9, wherein said TDM1 comprises the cyclic prefix length and said TDM3 comprises the sync/async information.

18. The method of claim 9, wherein said TDM3 comprises the cyclic prefix length and said TDM1 comprises the sync/async information.

* * * * *